United States Patent Office 2,888,204
Patented May 26, 1959

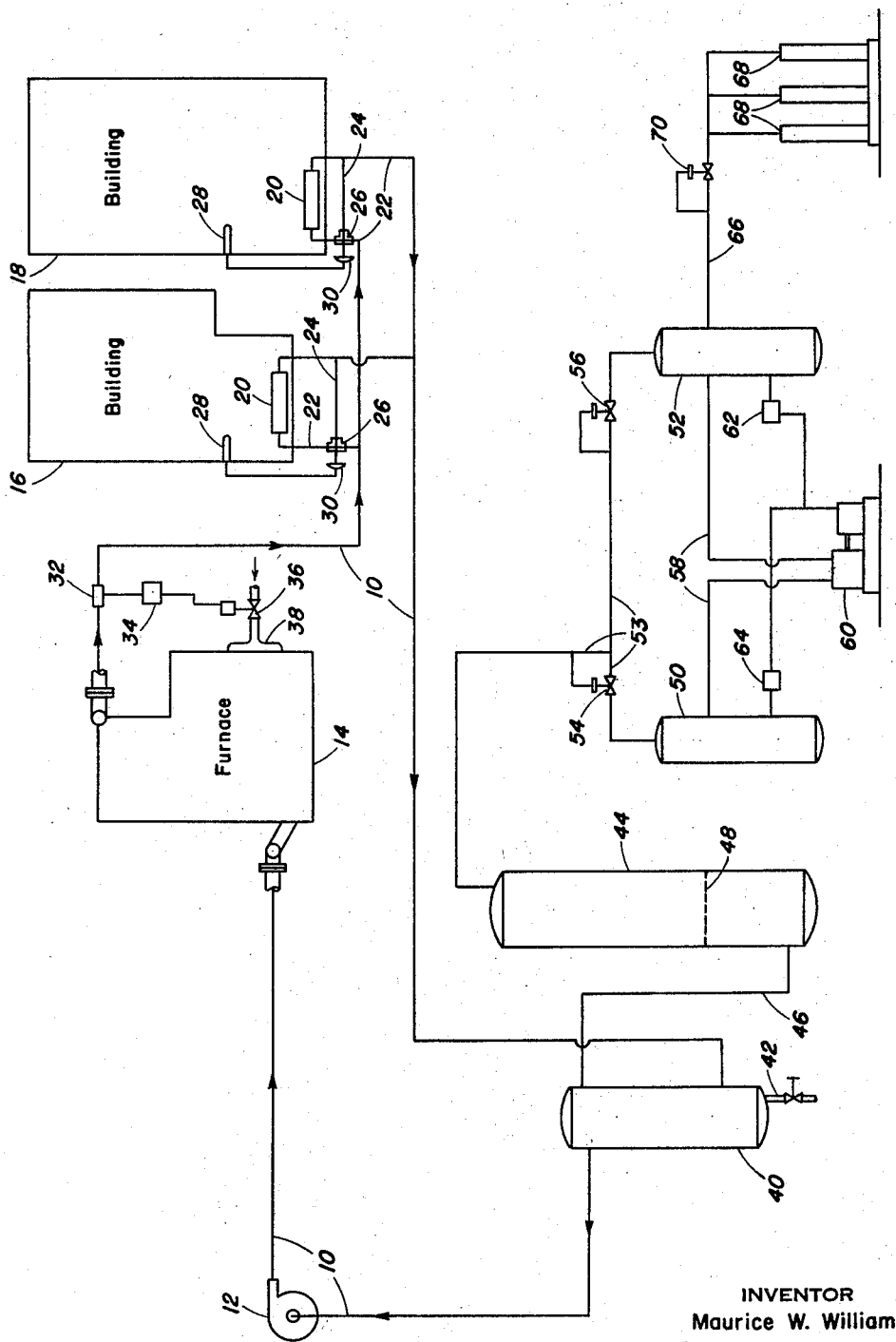

2,888,204

HOT WATER HEATING SYSTEM

Maurice W. Williams, Denville, N.J., assignor to Combustion Engineering, Inc., New York, N.Y., a corporation of Delaware Application June 28, 1957, Serial No. 668,759

3 Claims. (Cl. 237—59)

This invention relates to hot water heating systems of the type wherein water is forced by means of a pump through a continuous circuit which includes a heat exchanger for heating the water as well as a heat exchanger for extracting heat from the water.

It has particular relation to a high temperature, high pressure system of this type provided with mechanical pressurization.

In accordance with the invention there is provided a furnace into which fuel is introduced and burned. Associated with this furnace is a continuous, closed water or other fluid circulating system or circuit which has a portion positioned within the furnace so as to heat the circulated water. A pump is provided in this circuit for establishing a forced circulation of the water through the circuit and there is also provided heat exchangers as part of the circuit for extracting heat from the water and imparting it to a desired medium, as for example, heat exchangers in buildings to be heated. The pressure in the circulating system must be maintained sufficiently high to insure against vaporization of the water at the particular temperature at which the system is operated. This is accomplished in the present invention through a mechanical pressurizing system or assembly that employs an inert pressurizing gas. This pressurizing system includes a vertical tank having an inert pressurized gas such as oxygen-free nitrogen therein and with the tank being connected at its lower section with the circulating system. The tank is of sufficient volume to accommodate the expansion and contraction of the water in the system occasioned by the maximum temperature differential of this water that will be experienced during operation of the system.

The pressure of the inert gas in the pressurizing tank is maintained between predetermined minimum and maximum limits, with the minimum limit being sufficiently high to prevent vaporization of the water in the circulating system at the temperature at which the system is operated. To effect this control of the pressure in the pressurizing tank without loss of inert gas, there is provided a relief tank and a high pressure supply tank connected with the upper portion of the pressurizing tank. Communication between each of these tanks and the pressurizing tank is controlled by pressure-operated valves which are effective to bleed inert gas from the pressurizing tank to the relief tank when the pressure in the former exceeds its predetermined maximum value and to admit pressure from the supply tank to the pressurizing tank when the pressure in the latter falls below its minimum predetermined value. The pressure in the supply tank is maintained above the predetermined minimum value required in the pressurizing tank and inert gas is conveyed from the relief tank to the supply tank by means of a compressor which raises the pressure of the gas sufficient for introduction into the latter tank.

It is an object of this invention to provide an improved high temperature, high pressure hot water heating system embodying a mechanical pressurizing organization utilizing an inert gas.

Other and further objectives of the invention will become apparent to those skilled in the art as the description proceeds.

With the aforementioned objectives in view, the invention comprises an arrangement, construction and combination of the elements of the inventive organization in such a manner as to attain the results desired as more particularly set forth in the following detailed description of an illustrative embodiment, said embodiment being shown by the accompanying drawing wherein the single figure is a diagrammatic representation of a hot water heating system embodying the present invention.

Referring now to the drawing, wherein like reference characters are used throughout to designate like elements, the illustative and preferred embodiment of the invention depicted therein comprises a continuous circuit represented by conduit 10 and through which water or other suitable liquid is forced by pump 12. A portion of this circuit is positioned within the furnace 14 which may have its walls lined with tubes through which the water is forced with the water being heated to a desired temperature upon passing through these tubes located within the furnace.

In the illustrative organization the heating system is shown as associated with buildings to supply the heating requirements of the buildings although it is to be understood that it may be employed for other purposes, such as to supply the heat requirements for various industrial processes. As embodied, there is diagrammatically indicated in buildings 16 and 18 heat exchangers 20 which are connected with conduit 10 by means of branch conduits 22. In order to control the flow through these heat exchangers in accordance with the heating requirements of the building there is provided bypass 24 and associated with this bypass is three-way valve 26 to proportion the flow through the bypass and the heat exchanger. This valve is regulated in accordance with the temperature requirements of the building and for this purpose temperature responsive device 28 is provided in each of the buildings to regulate the positioning of valve 26 through suitable operating mechanism 30. Thus valve 26 proportions the flow through the bypass 24 in a manner to regulate the heat output and accordingly regulate the temperature of the buildings.

The temperature of the water in the circuit 10 as it leaves furnace 14 is maintained substantially constant and for this purpose there is provided temperature responsive device 32 in conduit 10 at a location where the water leaves the furnace with this device being effective to control the fuel supply to the furnace in a manner to maintain this temperature substantially constant. This control is effected through suitable control mechanism 34 which is regulated by and responds to the temperature responsive device 32 with this control 34 regulating the power-operated fuel control valve 36 which in turn controls the fuel introduced into furnace 14 through burners 38 and the heat input into the water flowing through the furnace tubes.

In series with the conduit 10 is sediment tank 40 which is effective to collect any foreign matter that may become entrained in the water circulating through the heating system. As shown, the water enters the lower portion of tank 40 and leaves the upper portion with the tank being sufficiently large so that the flow velocity through it will be slow to permit this foreign matter to settle to the bottom of the tank where it may be withdrawn periodically through the valved discharge conduit 42.

The pressure of the water in the circulating system must be maintained sufficiently high so as to insure that the water will not be vaporized or flashed to steam at the temperature at which the system is operated as, for example, 417° F. as it leaves the furnace. This is accomplished by means of a mechanical pressurizing system which includes pressurizing tank 44 connected at its lower section with the circulating system through connecting conduit 46. The temperature of the water in the circulating system will vary somewhat as a result of rather sudden changes in the heating requirements that are imposed upon the system and tank 44 is sufficiently large to accommodate the difference in volume of the water in the system that results from the maximum temperature variation of this water that the system will experience. Normally the lower portion of the tank 44 may have water disposed therein to the level indicated as 48, although this level will of course vary as the water temperature varies. In the upper portion of tank 44 there is provided an inert gas, such as nitrogen, which is maintained within certain minimum and maximum limits of pressure dependent upon the temperature at which the system is operated with the minimum limit being sufficiently high to insure against vaporization of the water system. As an example, when the temperature of the water as it leaves the furnace is approximately 417° F., as previously mentioned, the pressure of the inert gas in tank 44 may be maintained between a lower limit of 340 p.s.i. and an upper limit of 400 p.s.i.

With the use of this inert gas as the pressurizing medium the corrosion problems due to free oxygen in the water in the circulating system may be substantially eliminated. However, economic considerations dictate that this inert gas be conserved, and for this purpose there is provided a particular system for maintaining the pressure of the inert gas in tank 40 within its minimum and maximum limits without loss of gas. This system includes a low pressure receiving tank 50 and high pressure supply tank 52, both being connected to the upper end of pressurizing tank 44 by means of conduits 53.

Communication between each of the tanks 50 and 52 and the pressurizing tank 44 is controlled by pressure-operated valves 54 and 56 respectively. Each of these valves is in effect operated by and responds to the pressure in tank 44 with valve 54 being normally closed but automatically opened when the pressure in tank 44 exceeds its predetermined maximum value so that the excess pressure will be relieved with the inert gas being discharged into low pressure receiving tank 50. When the pressure in tank 44 falls below its minimum predetermined pressure, valve 56, which is normally closed, will open automatically to admit high pressure inert gas from tank 52 to tank 44 to raise the pressure in tank 44 up to its minimum predetermined value, since the pressure in tank 52 is maintained well above this minimum value.

The tanks 50 and 52 are interconnected through conduit 58 in series relation with which is the motor driven compressor 60. This compressor is effective to withdraw the low pressure inert gas from tank 50 and raise its pressure to a sufficiently high value for forcing the inert gas into the tank 52. The operation of compressor 60 is controlled by the pressure responsive control 62 which responds to the pressure in tank 52 and controls the operation of the compressor in a manner to maintain this pressure at a desired value, which, as previously mentioned, is well above the minimum predetermined pressure in tank 44.

In overriding relation with the control 62, however, is the pressure responsive control 64 which is responsive to the pressure in tank 50 and is effective to activate compressor 60 when the pressure in tank 50 approaches the predetermined maximum value permitted in tank 44. Control 64 is also effective to prevent activation of compressor 60 when tank 50 is exhausted of its inert gas. In normal operation of the system these extreme pressure conditions which activate control 64 will not prevail in tank 50 since the pressurizing system is designed to accommodate the normal operational requirements of the heating system without these extreme pressures being developed in tank 50. Thus pressure responsive control 64 is merely an emergency control which is operative to remedy a situation that may develop through a malfunctioning of the heating or pressurizing system.

Should the pressure in tank 52 fall below the value at which it is to be maintained in order to supply pressure to pressurizing tank 44 when required there is connected through conduit 66 the high pressure source cylinders 68 with pressure regulating valve 70 controlling communication between these cylinders 68 and tank 52 and operative to supply high pressure nitrogen thereto when the pressure in tank 52 falls below said value.

It is thus seen that with this invention there is provided a mechanical pressurizing system employing inert gas as a pressurizing medium which will eliminate corrosion problems in the heating system. The pressurizing system is a self-contained closed circuit that operates from a charge of inert gas and is simple but reliable in operation. With this pressurizing system the heating system will be under the desired pressure at all times, even before the system is put into operation and the pressure and temperature at which this system is operated may be regulated since the temperature and pressure controls are adjustable.

While I have illustrated and described a preferred embodiment of my invention it is to be understood that such is merely illustrative and not restrictive, and that variations and modifications may be made therein without departing from the spirit and scope of the invention. I therefore do not wish to be limited to the precise details set forth but desire to avail myself of such changes as fall within the purview of my invention.

What is claimed is:

1. A heating system having a varying load requirement and comprising a closed circuit through which a liquid heat exchange medium is circulated and including pump means to provide a positive circulation therethrough, a furnace through which the circuit passes and into which fuel is introduced and burned so as to heat said liquid, and a heat exchange means for transferring heat from said liquid, pressuring tank means connected with said circuit and being of sufficient volume to accommodate the differential volume of the liquid that is occasioned by sudden load fluxations on the system, said tank means containing nitrogen as the pressurizing gas, and being under sufficient pressure to prevent the liquid in the circuit from vaporizing at the temperature at which the system is operated, a first pressurized gas storage tank connected with the upper portion of the pressurized expansion tank, a pressure responsive means controlling communication between said pressurized expansion tank and said first storage tank operating to bleed nitrogen from the former to the latter when the pressure rises above a given value which is at least as high as said sufficient pressure with the pressure in said first storage tank being maintained below said given value, a second storage tank also connected with the upper portion of the pressurizing tank and maintained under a pressure greater than said sufficient pressure, pressure responsive means controlling communication between said pressurizing tank and second storage tank and operative to admit high pressure nitrogen to the pressurizing means when the pressure of the latter falls below a predetermined pressure which is at least as high as said sufficient pressure but not in excess of said given value, and means including a compressor interconnecting the first and second tank for conveying the nitrogen from the first to the second tank and increasing its pressure.

2. A high pressure, high temperature hot water heating system comprising a furnace into which fuel is introduced and burned, a continuous circuit through which the water is circulated with a portion thereof located in the furnace to heat the water, said circuit including pump means operative to force the water therethrough and heating units to transfer heat from the water, a pressurizing tank connected at its lower portion with said system and having in its upper portion an inert gas maintained under a predetermined pressure sufficient to insure against vaporization of the water at the temperature at which the system is operated, a first tank maintained under a pressure less than said predetermined pressure, means including a pressure responsive valve operative to bleed inert gas from said pressurizing tank to said first tank when the pressure in said pressurizing tank reaches a given value above said predetermined value, a second tank having inert gas therein under a pressure greater than said predetermined pressure, and means including a pressure responsive valve operative to admit gas from said second tank to said pressurizing tank when the pressure in the latter falls below a certain value that is at least as great as said predetermined value but not greater than the pressure in said second tank, and means for withdrawing inert gas from the first tank, increasing the pressure thereof sufficient for introduction into the second tank, and introducing it into the latter.

3. A high pressure, high temperature hot water heating system comprising a furnace into which fuel is introduced and burned, a continuous circuit through which the water is circulated with a portion thereof located in the furnace to heat the water, said circuit including a pump operative to force the water therethrough and a heating unit to transfer heat from the water, a vertical pressurized tank connected at its lower portion with said system and being of a volume sufficient to accommodate the difference in volume of the water in the system that will be occasioned by the maximum variation in temperature of the water experienced during operation of the system, said tank having in its upper portion an inert gas maintained between a minimum and maximum pressure with the minimum pressure being sufficient to insure against vaporization of the water at the temperature at which the system is operated, means operative to relieve gas from said tank when the maximum pressure is exceeded including a relief tank connected with the upper portion of the vertical pressurized tank, a pressure operated valve communication between the pressurized tank and the relief tank, said valve being responsive to the pressure in the pressurized tank and opened thereby when it exceeds said maximum value so as to relieve the excess pressure from said pressurized tank, a supply tank for said inert gas wherein the gas is maintained at a pressure substantially higher than said minimum pressure, said supply tank being connected to the pressurized tank, a pressure operated valve controlling communication between the pressurized tank and the supply tank, said valve being responsive to the pressure in the pressurized tank and opened when said pressure falls below said minimum value, said relief and supply tanks being interconnected, a compressor means forming a part of this interconnection operation to withdraw the gas from the relief tank, to increase its pressure to a value substantially higher than said minimum pressure, and to introduce it into the supply tank.

References Cited in the file of this patent

UNITED STATES PATENTS 354,640   Johnson et al.   Dec. 21, 1886